United States Patent [19]
Umeda et al.

[11] Patent Number: 5,994,813
[45] Date of Patent: Nov. 30, 1999

[54] ROTARY ELECTRIC MACHINE

[75] Inventors: Atsushi Umeda, Okazaki; Tsutomu Shiga, Nukata-gun; Shin Kusase, Obu, all of Japan

[73] Assignee: Denso Corporation, Kariya, Japan

[21] Appl. No.: 09/084,212

[22] Filed: May 26, 1998

Related U.S. Application Data

[63] Continuation of application No. PCT/JP97/01778, May 26, 1997.

[30] Foreign Application Priority Data

Dec. 10, 1997 [JP] Japan ............................... 9-362063

[51] Int. Cl.$^6$ ..................................................... H02K 1/00
[52] U.S. Cl. .................. 310/180; 310/201; 310/206; 310/208; 310/210; 310/179; 310/184; 310/198; 310/216; 310/270; 29/596; 29/605; 29/825
[58] Field of Search ..................................... 310/201, 206, 310/208, 210, 51, 179, 184, 198, 213, 216, 270; 29/596, 605, 825

[56] References Cited

U.S. PATENT DOCUMENTS

| | | |
|---|---|---|
| 1,822,261 | 9/1931 | Apple . |
| 2,928,963 | 3/1960 | Bertsche et al. . |
| 3,431,639 | 3/1969 | Reimer ..................................... 310/208 |
| 4,755,698 | 7/1988 | Frister et al. . |
| 4,870,307 | 9/1989 | Kitamura et al. . |
| 5,093,591 | 3/1992 | Kitamura et al. . |
| 5,097,167 | 3/1992 | Kanayama et al. . |
| 5,691,590 | 11/1997 | Kawai et al. . |
| 5,742,498 | 4/1998 | Taniguchi et al. . |
| 5,778,512 | 7/1998 | Ichikawa et al. . |

FOREIGN PATENT DOCUMENTS

| | | |
|---|---|---|
| 727 867 A1 | 8/1996 | European Pat. Off. . |
| 3704780A1 | 11/1988 | Germany . |
| 48-442 | 1/1973 | Japan . |
| 50-47102 | 4/1975 | Japan . |
| 59-159638 | 9/1984 | Japan . |
| 62-272836 | 11/1987 | Japan . |
| 63-274335 | 11/1988 | Japan . |
| 64-5340 | 1/1989 | Japan . |
| 3-159549 | 7/1991 | Japan . |
| 5-50969 | 7/1993 | Japan . |
| 7-303351 | 11/1995 | Japan . |
| 8-205441 | 8/1996 | Japan . |
| 8-298756 | 11/1996 | Japan . |
| 122741 | 2/1919 | United Kingdom . |
| 2 304 236 | 3/1997 | United Kingdom . |
| 84/01478 | 4/1984 | WIPO . |
| 92/06527 | 4/1992 | WIPO . |

OTHER PUBLICATIONS

Patent Abstracts of Japan, vol. 015, No. 118 (E–1048), Mar. 22, 1991 & JP 03 007036 A (Hitachi Ltd), Jan 14, 1991.

*Primary Examiner*—Nestor Ramirez
*Assistant Examiner*—Thanh Lam
*Attorney, Agent, or Firm*—Pillsbury Madison & Sutro, LLP

[57] ABSTRACT

A stator winding has a plurality of conductor members forming coil ends, and each of the conductor members of the coil ends is hardened and heat treated to have hardness which changes along the length of conductor members. Therefore, the stiffness of the coil ends changes and resonant vibration of the stator can be reduced.

19 Claims, 5 Drawing Sheets

ROTARY ELECTRIC MACHINE

This is a continuation of international Application PCT/JP97/01778, with an international filling date of May 26, 1997.

BACKGROUND OF THE INVENTION

1. Field of the Invention

The present invention relates to a rotary electric machine driven by an internal combustion engine which is mounted in a vehicle such as a passenger car, a truck, or boat.

2. Description of the Related Art

As noise has been reduced, requirements for reducing noise of engine accessories has become severe. For example, reduction in noises of an alternator, which always operates while the vehicle is running, is strongly needed. Because the alternator is also required to reduce the weight by reducing the thickness of the housing, which may increase magnetic vibrations, the noise reduction of the alternator has been very difficult.

In general, the magnetic noise is generated when magnetic change in the gap between a stator and a rotor vibrates the stator core, windings and frames supporting the stator core to make an air wave of condensation and rarefaction. It is well known that if the weight of the stator increases, the noises can be reduced.

JP-B-5-50969 proposes to suppress the magnetic vibration of the stator by increasing stiffness of the aluminum frame supporting the stator. However, the aluminum frame can not increase stiffness of the stator directly, and the effect is limited.

JP-A-62-225140 proposes to form a variety of magnetic reluctances in the stator core to moderate the vibration frequency generated in the operation, thereby reducing the magnetic noise. This does not reduce the vibration amplitude, and may vibrate various parts surrounding the alternator. Thus, there was no effective structure for reducing the magnetic noise.

The magnetic vibration of the stator may be generated due to resonation although the amplitude of the vibration is rather small. Such vibration may be transmitted to portions of the stator winding extending from the stator core, which amplify noises.

SUMMARY OF THE INVENTION

The present invention is to provide a rotary electric machine which can suppress the vibration of the stator and the magnetic noise.

Another object of the present invention is to suppress resonance of the stator.

Another object of the present invention is to increase an occupation ratio of the conductor members in the slots.

In a rotary electric machine according to the present invention, a stator winding is composed of a conductor member extending in the axial direction of a rotor, and the conductor member has hardness changing along the length thereof. Accordingly, resonance amplitude of the stator can be decreased.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF PREFERRED EMBODIMENTS

[First Embodiment]

A 100-ampere-class alternator for a vehicle according to a first embodiment of the invention is described with reference to the drawings.

Figure 1:
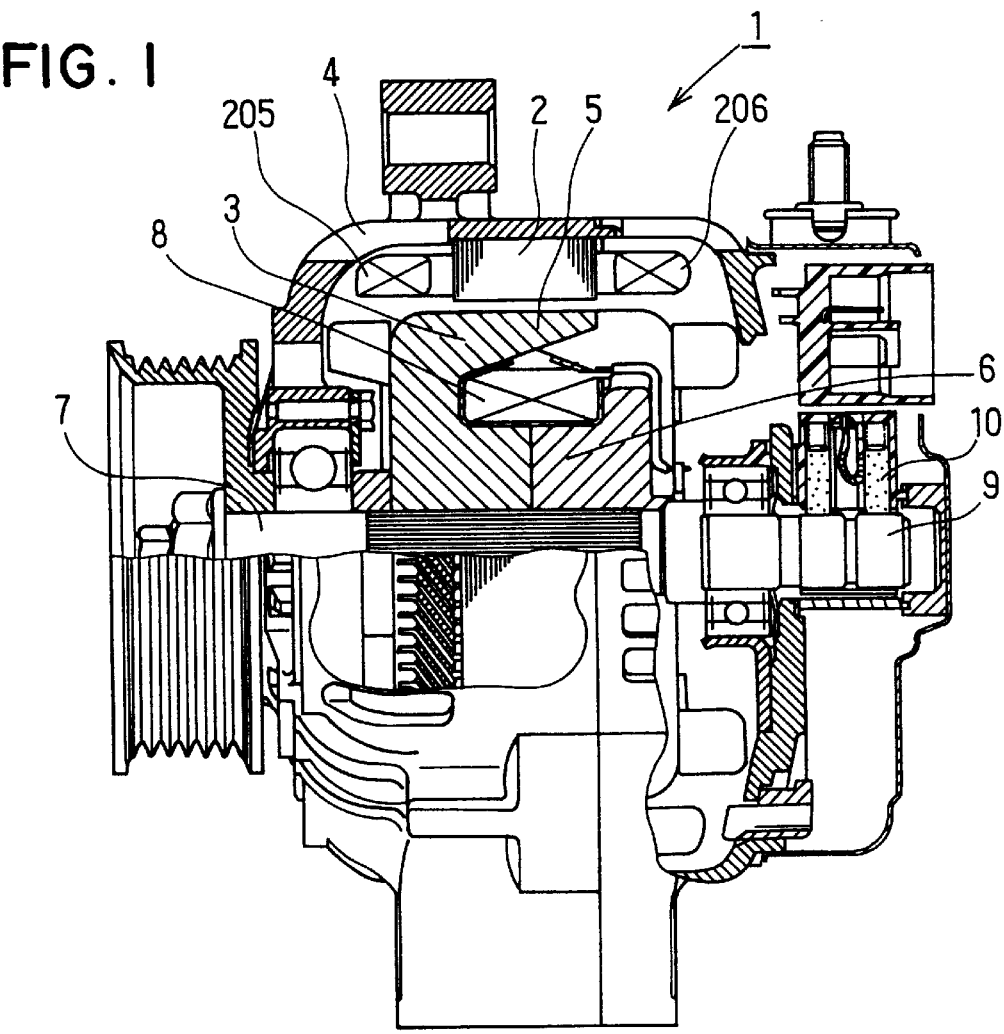
FIG. 1 is a cross-sectional view of an alternator for a vehicle according to a first embodiment of the present invention.

In FIG. 1, alternator 1 is composed of stator 2 as an armature, rotor 3 as a magnetic field and frame 4 for supporting stator 2 and rotor 3. Frame 4 contains therein a regulator and a rectifier for converting ac power to dc power, which are not shown.

Rotor 3 is composed of pole core 6 having twelve claw poles 5 and shaft 7 which is press-fitted into pole core 6 via a serrated surface thereof. The left end of shaft 7 in FIG. 1 carries a pulley for inputting driving power. The center boss portion of pole core 6 has a field coil 8 wound therearound. Field coil 8 is connected to the regulator through slip rings 9 and brushes 10. Rotor 3 provides N and S poles alternately from claw poles.

Stator 2 has stator core 201 provided with 36 slots 202. Stator core 201 is composed of laminated electric steel sheets having thickness of 0.5 mm. The axial thickness of stator core 201 is about 30 mm and outside diameter thereof is about 120 mm.

Figure 2:
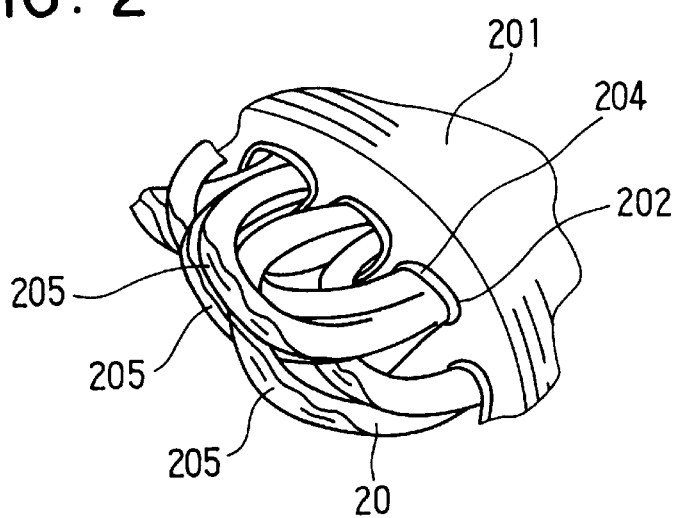
FIG. 2 is a fragmentary perspective view illustrating U-turn portions of a winding.
Figure 3:
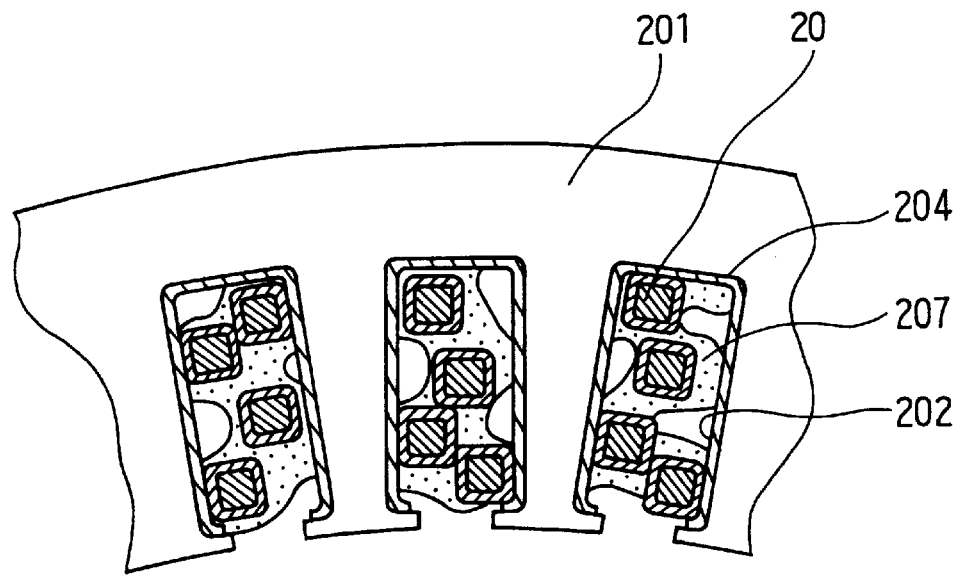
FIG. 3 is a cross-sectional view illustrating the stator shown in FIG. 1.

A portion of continuous copper wire 20 is inserted each one of slots 202 to form a multi-phase stator winding. As shown in FIG. 2, copper wire 20 has U-turn portions extending axially from different slots 202. Electric insulating members 204 are disposed between copper wire 20 and the walls of slots 202. Copper wire 20 is inserted into each slot 202 to hold insulator 204 and is fixed therein by adhesive agent 207. Copper wire 20 has a rectangular cross-section and is coated with resinous insulation material.

Copper wire 20 is processed to have the area of the rectangular cross-section of about 2 mm$^2$ all over the length and also to increase the hardness thereof.

A plurality of U-turn portions or coil ends 205, 206 are disposed annularly along the circumferences on the opposite axial ends of stator core 201. U-turn portions 205 on the pulley-side are heated and softened above the edge of U-turn portions 205 through the insulation coating or after removing the insulation coating, as shown in FIG. 2.

Figure 4:
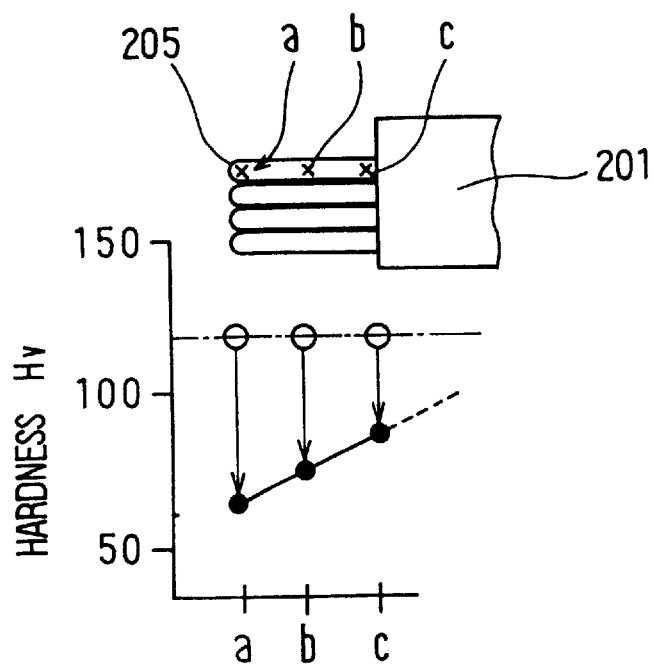
FIG. 4 is a graph showing a distribution of hardness of the U-turn portions of the winding of the first embodiment in the axial direction.

As a result, the hardness of the hardened portions after the above shaping process are reduced, and so that different portions of wire 20 can have different hardness as shown in FIG. 4. Thus, the edge of U-turn portions 205 become softer than others, and portions closer to the slots becomes harder. In other words, U-turn portions 205 on the pulley-side become softer at portions closer to the edge and harder at portions closer to the slots. Further, U-turn portions 205 of the pulley-side are softer than the other U-turn portions 206.

As a result, stator 2 has low vibration-stiffness on the pulley-side thereof and high vibration-stiffness on the opposite side, thereby providing a difference in the vibration phase therebetween. This moderates and reduces the amplitude of the vibration and reduces the magnetic noise.

Because hardness of the U-turn portions are changed, the transmission of the vibration from stator core 201 to U-turn portions is suppressed so that the magnetic noise, which is generated due to vibration of U-turn portions, can be suppressed.

Since copper wire is heated after it is processed for shaping, the difference in the hardness can be made bigger than the round wire. This is effective for the reduction of the vibration and magnetic noise.

The above described shaping process and heating-and-softening process are very simple and can dispense with special and expensive processes for changing composition of a wire material along the axis of the stator. Moreover, the heating-and-softening process can be carried out very simply above the edge of U-turn portions 205.

The shaping process of copper wire 20 can be carried out very easily, and the hardness of copper wire 20 can be changed as desired.

Copper wire 20 can be formed from a flat wire on the market if it has a desirable hardness after the shaping process and is not annealed to be softened.

Figure 5:
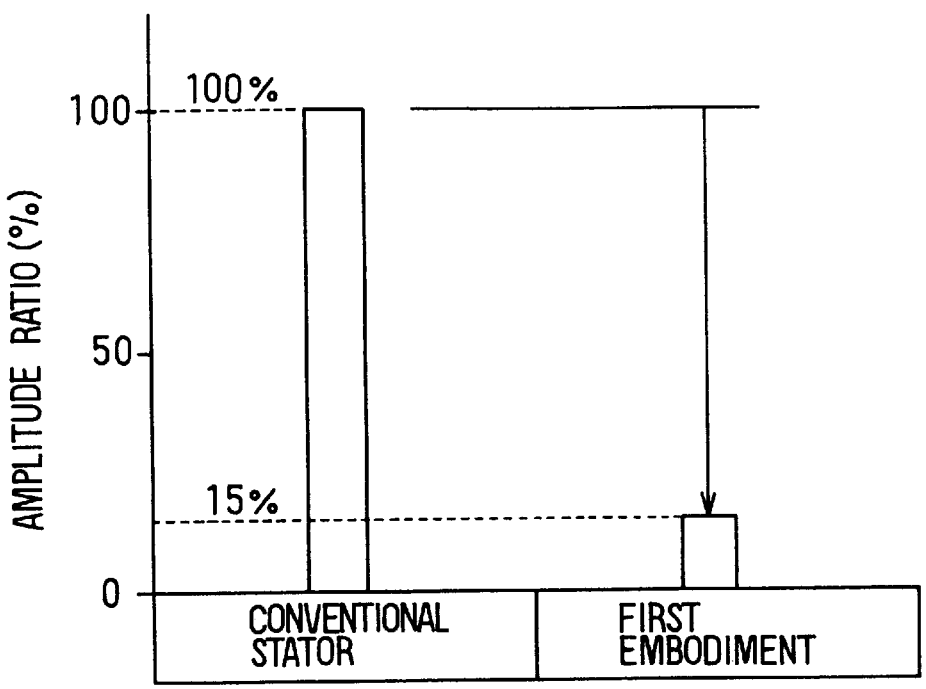
FIG. 5 is a graph showing a difference in the resonant characteristics between the stator according to the first embodiment and a conventional stator.

The effect of the above structure is shown in FIG. 5, in which ratios of resonance amplitude are compared between the stator of the alternator according to the first embodiment and a stator of a conventional 100-ampere-type alternator under the same vibration amplitude. It was found that the ratio of the stator according to the first embodiment was less than ⅙ of the ratio of the conventional stator.

Figure 6:
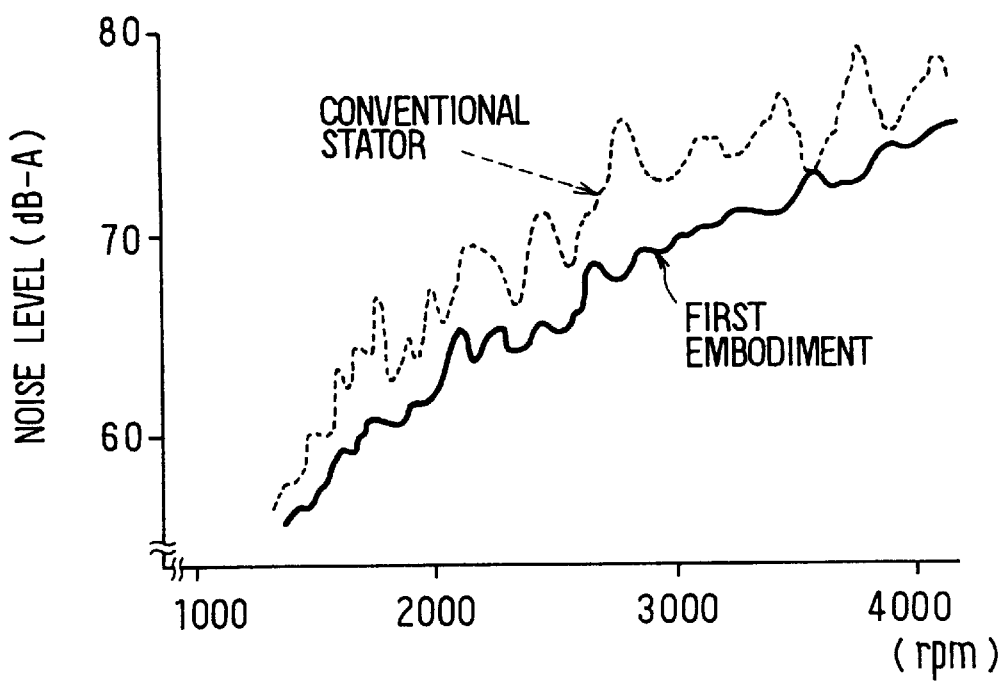
FIG. 6 is a graph showing comparing the magnetic noise of the stator core according to the first embodiment with that of a conventional stator.

FIG. 6 shows distribution of the magnetic noises over the number of revolutions per minutes. It is clear that the magnetic noise generated by the alternator according to the first embodiment of the present invention is smaller than a conventional alternator. In general, the magnetic noise generated in the engine speed range from the idling speed to 1500 rpm, which corresponds to the speed range of the alternator from 1000 to 4000 with the pulley ratio being 2.5, is particularly harsh. However, the magnetic noise in this speed range is 5–7 dB less than the noise of the conventional alternator. The alternators according to the first embodiment of types other than 200-ampere-type have the same effect.

[Second Embodiment]

A stator core according to a second embodiment of the present invention is described with reference to FIGS. 7–9. A stator winding is composed of a plurality of conductor segments 203 connected one another as shown in FIG. 9.

Conductor segments 203 are formed by shaping round wires into flat segments. The shaping process hardens conductor segments 203. The shape of conductor segments 203 corresponds to the shape of the cross-section of the slots. Conductor segments 203 are inserted into the slots and connected to form a winding having a high occupation ratio of conductors.

Each of conductor segments 203 has two straight conductor members 203A and a U-turn portion 203B. As shown in FIGS. 7 and 8, straight conductor members 203A of conductor segments 203 are aligned in slot 202 in the radial direction. U-turn portion 203B are disposed on an axial end of stator core 201. Straight conductor members 203A extending from the other axial end of stator core 201 are bent and connected to ends of other segments 203 as shown in FIG. 7 to form the stator winding as a whole.

Figure 7:
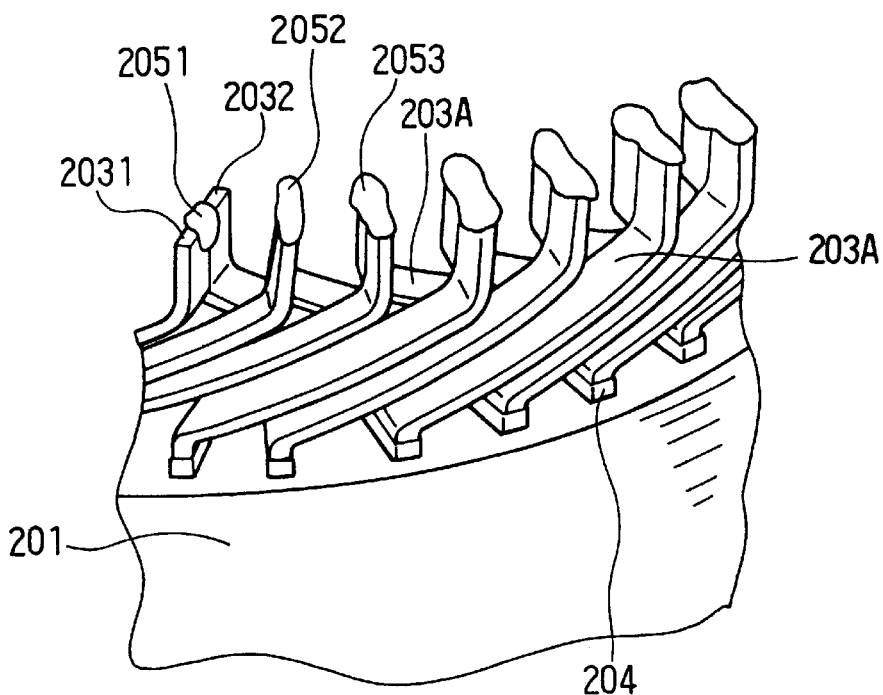
FIG. 7 is a perspective view of an axial end of the stator according to a second embodiment of the present invention.

In FIG. 7, conductor members 2031, 2032 of conductor segments 203 are welded at edge portion 2051. This welding also softens the conductor members. Thus, the welding at edge portions 2052, 2053 and others connect and soften the conductor members of all the conductor segments 203 very easily.

As shown in FIG. 7, a half of straight conductor members 203A extends from the outer layer of slots 202 in one circumferential direction and the other half conductor members 203A extend from the inner layer of slots 202 in the other circumferential direction so that those conductor members 203A, 203B can be welded at the ends thereof. Accordingly, all the coil ends are spaced apart from one another in the circumferential and radial directions.

Figure 8:
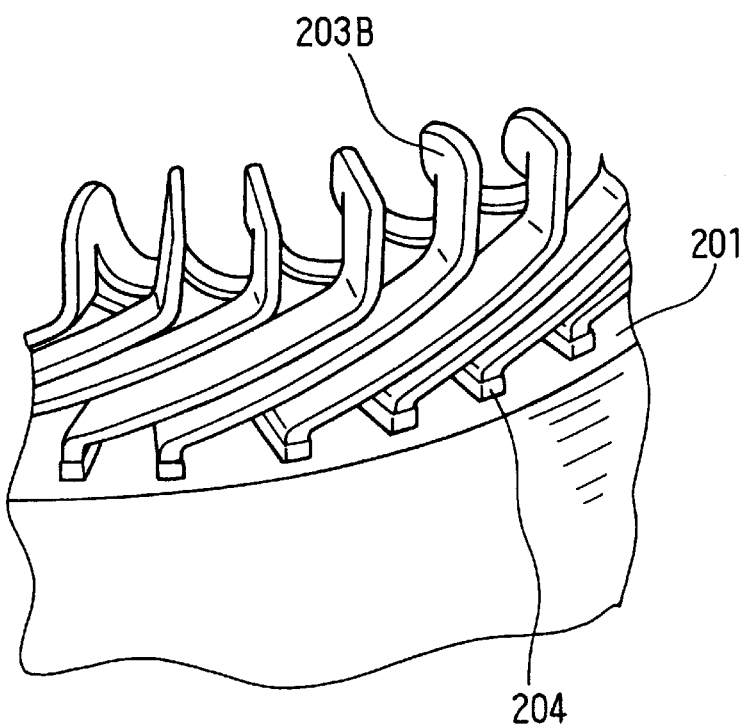
FIG. 8 is a perspective view of the other end of the stator according to the second embodiment.
Figure 9:
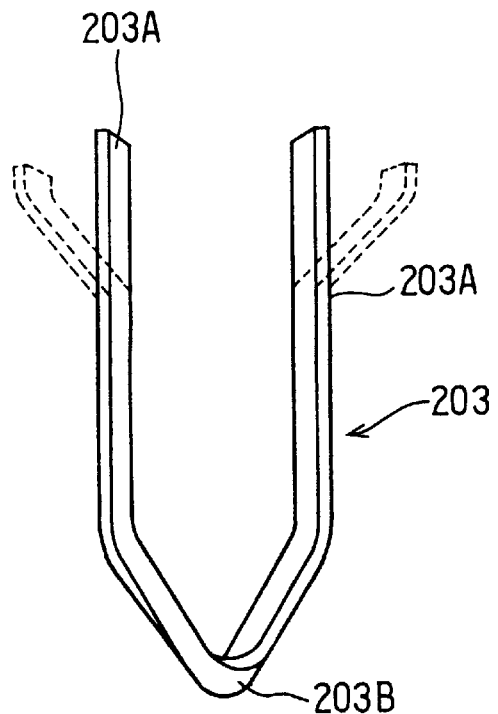
FIG. 9 is a perspective view of a conductor segment of the stator according to the second embodiment.

As shown in FIG. 8, the coil ends having U-turn portions 203B extend from slot 202 and are spaced apart from one another.

In the second embodiment, all segments 203 are connected and softened only by the welding to have different hardnesses, thereby reducing vibration effectively The coil ends are disposed on an axial end of stator core 201 to be heated and softened by welding and other coil ends having U-turn portion are disposed on the other end of stator core 201 with the hardness unchanged, so that difference in the hardness in the axial direction can be provided to reduce the vibration effectively.

As shown in FIG. 9, U-turn portions 203B of conductor segments 203 once hardened by the shaping process are further hardened when the U-turn shape is formed by the bending process, and the vibration can be further reduced. If stator core 201 and the stator winding are deemed a cylindrical member, portions having the same hardness are disposed on the same circumferential plane, and axially different portions have different hardnesses, thereby providing a high vibration reduction effect. As shown in FIG. 7, welded portions 2051, 2052, 2053 and others can be easily inspected to know the result of heating-and-softening process.

[Other embodiments]

The coil ends on the side opposite the pulley can be heated instead of the coil ends on the pulley side according to the first embodiment.

In the first and second embodiments, the edge or end portions can be heated at a comparatively low temperature to prevent damage of the coating of conductor segments 203 by cooling the coil ends on the other side of stator core.

Figure 10:
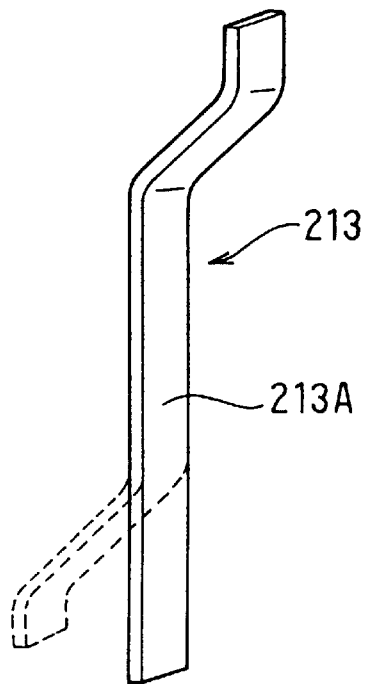
FIG. 10 is a perspective view of a conductor segment according to another embodiment of the present invention.

Conductor segments 213 shown in FIG. 10 can be also used. Each of conductor segments 213 has a straight conductor member 213A, which is inserted into a slot in an axial direction from one end and is bent to cover a certain pitch at the other end thereof. Then each conductor member 213 is heated and connected by a welder to form a winding.

The distribution of different hardnesses can be changed from that shown in FIG. 4. For example, it is also possible that the hardness of points b, c are not lowered as shown in FIG. 4 and only point a is softened as shown in FIG. 4.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A rotary electric machine comprising:

a rotor composed of magnetic poles alternately disposed at equal intervals in a circumference direction thereof, and a stator disposed opposite to said rotor composed of stator core with windings in slots formed in the stator core, wherein said windings comprise a plurality of quadrilateral hardened conductor members extending in one axial direction of said rotor forming a plurality of heated coil ends and in the other axial direction forming a plurality of unheated coil ends, whereby said conductor members have a hardness changing along the length thereof so that said plurality of unheated coil ends are harder than said heated coil ends.

2. The rotary electric machine as claimed in claim 1, wherein said hardness of a portion of said conductor members increases as said portion becomes closer to said slots.

3. The rotary electric machine as claimed in claim 1, wherein said conductor members are portions of a continuous wire.

4. The rotary electric machine as claimed in claim 1, wherein said conductor members are a plurality of segments which are connected with one another at said heated coil ends.

5. The rotary electric machine as claimed in claim 4, wherein each of said plurality of segments has a U-turn portion.

6. The rotary electric machine as claimed in claim 1, wherein said rotary electric machine is an alternator for a vehicle.

7. The rotary electric machine as claimed in claim 1, wherein each of said heated coil ends has a heated U-turn portion.

8. The rotary electric machine as claimed in claim 1, wherein said plurality of quadrilateral hardened conductor members have square cross-sections.

9. The rotary electric machine as claimed in claim 1, wherein said plurality of quadrilateral hardened conductor members have rectangular cross-sections having longer radial sides and are radially disposed in two layers in said slots, and each of said unheated coil ends has one of said conductor members extending from one of said two layers in one of said slots, another of said conductor members extending from another of said two layers in another of said slots with shorter sides of said rectangular cross-sections of said conductor members being arranged in a circumferential direction.

10. The rotary electric machine as claimed in claim 9, wherein each of said heated coil ends has one of said conductor members extending from one of said two layers in one of said slots and another of said conductor members extending from another of said two layers in another of said slots, and one of said shorter sides of said one of said conductor members is welded to one of said shorter sides of said another of said conductor members.

11. The rotary electric machine as claimed in claim 1, wherein each of said unheated coil ends has a U-turn portion.

12. The rotary electric machine as claimed in claim 11, wherein each said U-turn portion has a square cross-section.

13. The rotary electric machine as claimed in claim 11, wherein each said U-turn portion has a rectangular cross-section.

14. The rotary electric machine as claimed in claim 13, wherein said rectangular cross-section of said U-turn portion has longer sides which extend radially from a central longitudinal axis of said stator core and shorter sides which extend in a circumferential direction of said stator core.

15. A rotary electric machine comprising:

a rotor composed of a plurality of magnetic poles alternately disposed at equal intervals in a circumference direction thereof, a stator having a stator core with a plurality of slots and a plurality of conductor members disposed in said slots, wherein said conductor members extend outwardly from opposite ends of said stator core, and each of said conductor members has a different hardness along the length thereof.

16. The rotary electric machine as claimed in claim 15, wherein each of said conductor members has hardness at a portion that increases as said portion becomes closer to one end of said stator core.

17. The rotary electric machine as claimed in claim 15, wherein each of said conductor members has a cross-section which is deformed to be hardened.

18. The rotary electric machine as claimed in claim 17, wherein said cross-section is square.

19. The rotary electric machine as claimed in claim 17, wherein said cross-section is rectangular.

* * * * *

UNITED STATES PATENT AND TRADEMARK OFFICE
CERTIFICATE OF CORRECTION

PATENT NO. : 5,994,813
DATED : November 30, 1999
INVENTOR(S) : Umeda, et. al.

It is certified that error appears in the above-identified patent and that said Letters Patent is hereby corrected as shown below:

Title page, item [54] and col. 1,

Please change

"ROTARY ELECTRIC MACHINE"

to

--ROTARY ELECTRIC MACHINE WHICH CAN SUPPRESS VIBRATION OF A STATOR AND MAGNETIC NOISE--

Title page, item
"[63] Continuation of application No. PCT/JP97/01778, May 26, 1997".

Please add under [30] Foreign Application Priority Data:

--May 26, 1997 [JP] Japan ............... PCT/JP97/01778--.

Signed and Sealed this

Fourteenth Day of November, 2000

Attest:

Q. TODD DICKINSON

*Attesting Officer*　　　*Director of Patents and Trademarks*

UNITED STATES PATENT AND TRADEMARK OFFICE
CERTIFICATE OF CORRECTION

PATENT NO. : 5,994,813  
DATED : November 30, 1999  
INVENTOR(S) : Umeda et al.

Page 1 of 1

It is certified that error appears in the above-identified patent and that said Letters Patent is hereby corrected as shown below:

Cover page,
Please delete:
"[63] Continuation of application No. PCT/JP97/01778, May 26, 1997"

Signed and Sealed this

Thirty-first Day of July, 2001

*Attest:*

NICHOLAS P. GODICI
*Attesting Officer*      Acting Director of the United States Patent and Trademark Office